Aug. 1, 1961   A. ROTH   2,994,445
PARKING AND WAREHOUSING SYSTEM
Filed Feb. 4, 1958   6 Sheets-Sheet 3
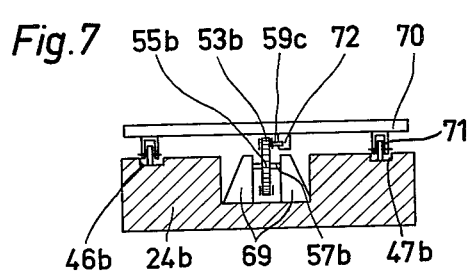
Fig.7
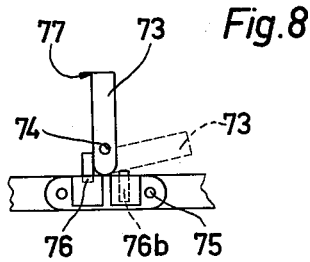
Fig.8
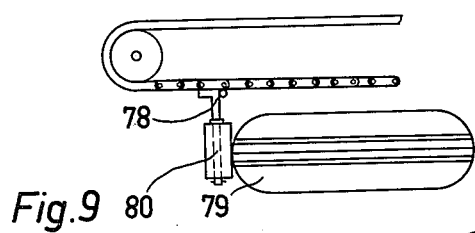
Fig.9
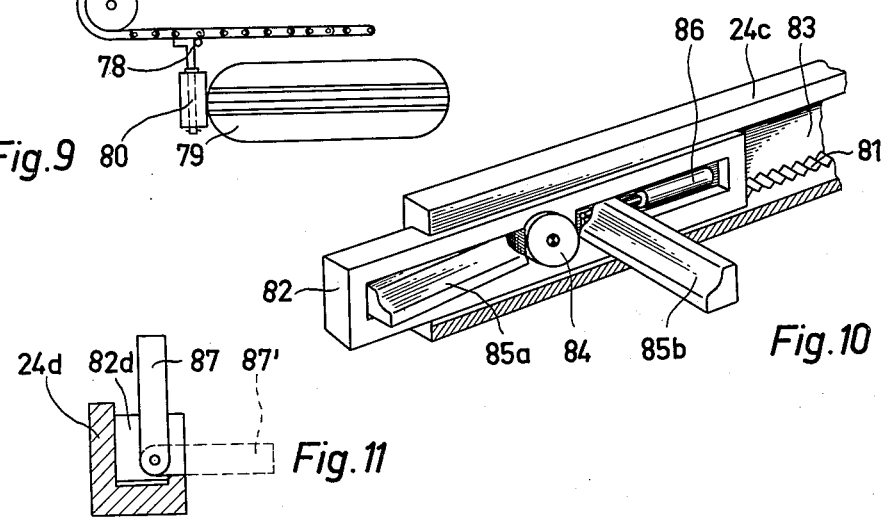
Fig.10
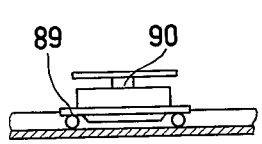
Fig.11
Fig.12
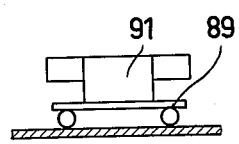
Fig.13
INVENTOR
ANTON ROTH
BY *[signature]*
AGENT

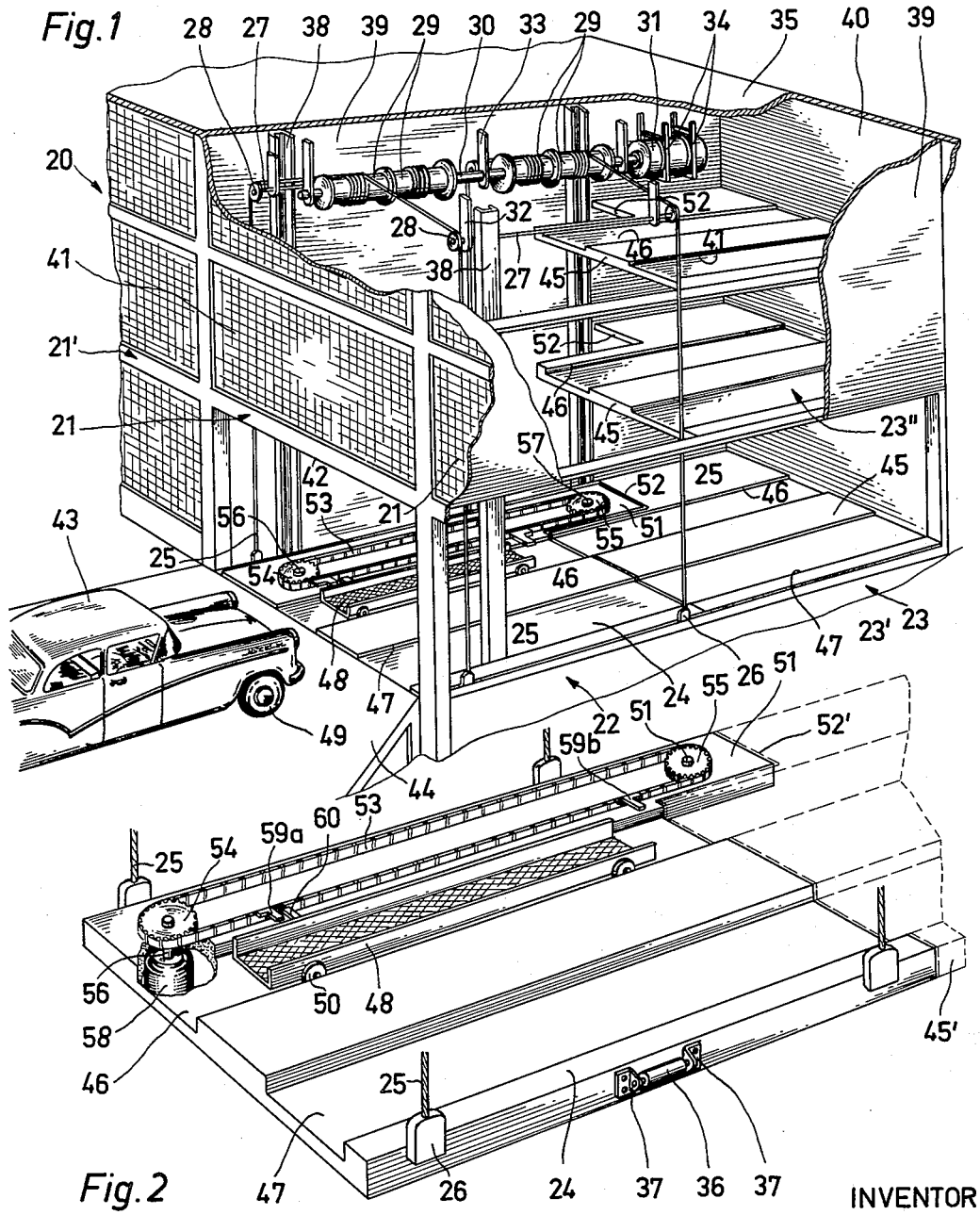

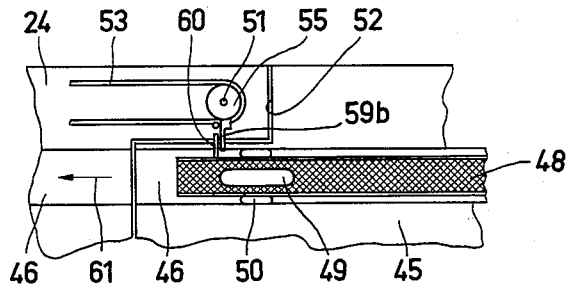
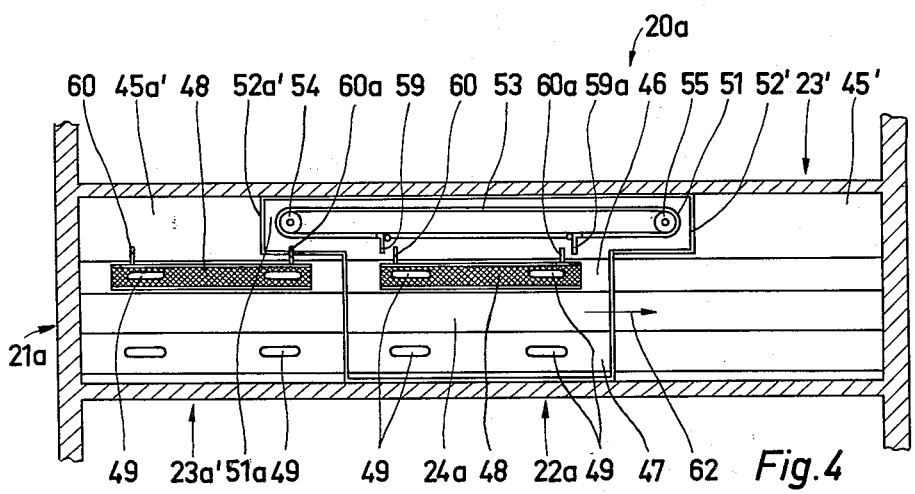
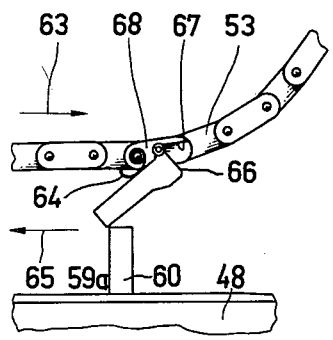
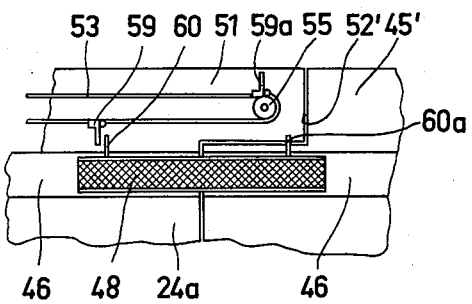

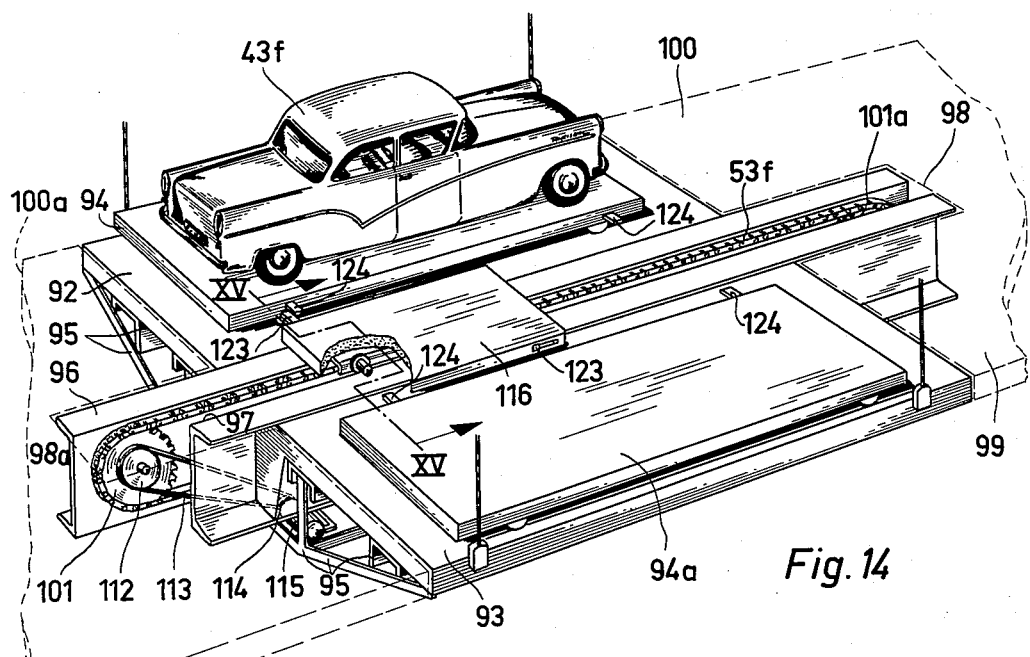
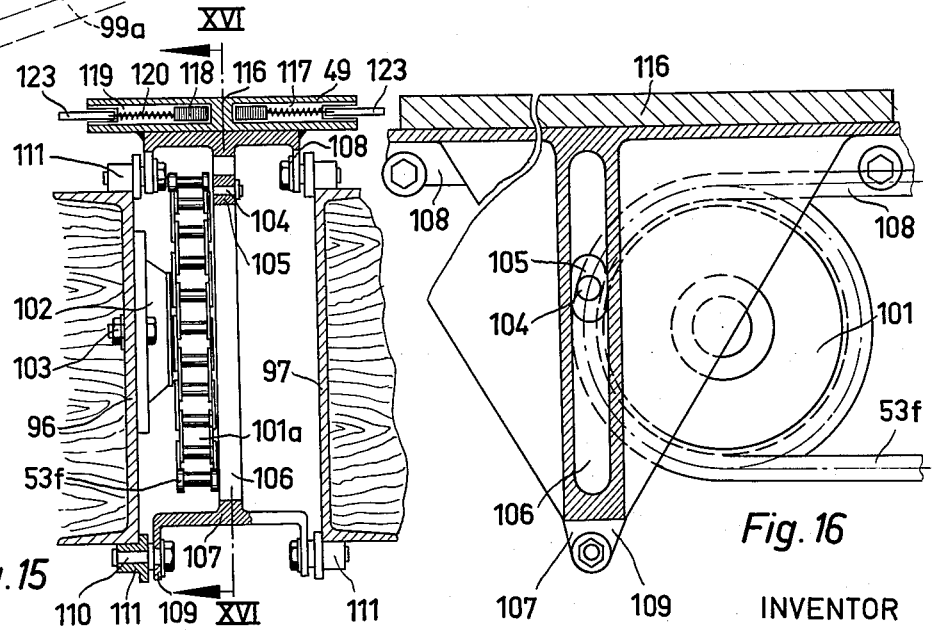
Fig. 14
Fig. 15
Fig. 16
INVENTOR
ANTON ROTH

Aug. 1, 1961   A. ROTH   2,994,445
PARKING AND WAREHOUSING SYSTEM
Filed Feb. 4, 1958   6 Sheets-Sheet 5

INVENTOR
ANTON ROTH
By [signature]
AGENT

United States Patent Office 2,994,445
Patented Aug. 1, 1961

1

2,994,445
PARKING AND WAREHOUSING SYSTEM
Anton Roth, Neue Mainzer Str. 30, Frankfurt am Main,
Germany
Filed Feb. 4, 1958, Ser. No. 713,182
28 Claims. (Cl. 214—16.1)

The present invention relates to improvements in parking and warehousing systems, and more particularly to a multi-level warehouse or automobile parking garage.

An important object of the invention is to provide an improved warehouse or garage for economical storage of automobiles or other bulky goods which requires little supervision and may thus be operated by a small number of attendants.

Another object of the invention is to provide an improved parking or warehousing system in which the conveyors for movement of goods or automobiles into or from parking compartments are mounted on and form part of the elevator.

An additional object of the invention is to provide a parking or warehousing system in which more than one compartment at each level of the structure can be serviced by a single elevator.

A further object of the invention is to provide a fully or semi-automatic parking or warehousing system comprising vertical and horizontal conveyor means which are capable of servicing one, two or more compartments at each level of the building.

A concomitant object of my invention is to provide a parking or warehousing system of the above described character which may be operated by relatively simple machinery and requires no extensive and complicated control apparatus for its actuation.

A still further important object of the invention is to provide a parking system in which the conveyors for horizontal and vertical movements are so constructed and arranged as to permit frequent and rapid parking or unparking of automobiles.

A yet further and more specific object of my invention is to provide an improved horizontal conveyor which, in cooperation with an elevator, is capable of moving automobiles or other bulky goods into or from one, two or more parking or storage compartments at all levels of a multi-storey garage or warehouse.

My invention is particularly suitable for use in automobile parking garages, especially in congested metropolitan areas where the parking space is not available and the garages necessarily extend over a great number of levels above and/or below the ground.

The novel system comprises basically a plurality of superposed parking compartments in one or more rows, and one or more elevators so constructed that a single elevator, depending upon its design, may service one, two or more adjacent superposed rows of parking compartments. Each elevator platform has at least one horizontal ledge extending into an adjacent parking compartment whose floor has a suitable recess for permitting the passage of the ledge when the elevator is moved in vertical direction. The elevator ledge is the terminal of a horizontal conveyor which, either directly or by means of a dolly, a platform truck or the like, moves an automobile from the elevator platform onto the floor of an adjacent parking compartment and vice versa. The displacement of the automobile into or from a parking compartment is caused by suitable followers adapted to engage with or forming part of the horizontal conveyor, the followers engaging the automobile wheels or a dolly on which the automobile wheels are at rest.

The elevator platform may be provided with two ledges, one at each longitudinal end thereof, and the operating range of the horizontal conveyor may be extended onto each ledge so that a single elevator with a single horizontal conveyor is capable of servicing two rows of superposed parking compartments at the respective longitudinal ends of the elevator platform. It is also possible to use a twin elevator which, with the aid of a centrally mounted horizontal conveyor, services four rows of parking compartments, two at each longitudinal end of its platform.

The horizontal conveyor may comprise a flexible element such as an endless chain or an endless belt moving in a horizontal or vertical plane in the longitudinal direction of the elevator platform, a spindle, a toothed bar or the like, and is coupled with a reversible motor to entrain the followers operatively connected thereto for movement in both longitudinal directions of the elevator platform.

The followers may be retractible or pivotable in one or both directions, and may be connected directly with a moving element of the horizontal conveyor which moves the full length and onto one or both ledges of the elevator platform, or may be coupled to such elements by means of a dolly or other apparatus releasably or permanently connected with the main element of the horizontal conveyor. The horizontal conveyor may further comprise magnetic means or lifting jacks engaging the underside of an automobile which latter may be driven directly onto the elevator platform or onto a dolly or similar wheel-mounted device.

It is further within the scope of my invention to provide additional horizontal conveyors in the parking compartments which operate in only one or two directions to complete the parking operation or to partly remove an automobile from the parking compartment.

Other features, advantages and attributes of my invention will become apparent in the course of the following detailed description of certain embodiments selected for illustration in the accompanying drawings, and the invention will be finally pointed out in the appended claims.

In the following description, my invention will be explained in connection with an automobile parking garage but I desire it to be understood that other types of goods may be conveyed and stored in like manner and that my invention is applicable to all types of systems serving for storage and frequent interchange of bulky articles.

In the drawings,

FIG. 1 is perspective view of a multi-storey automobile garage with certain of its walls partly broken away;

FIG. 2 is an enlarged perspective view of the elevator platform and of the horizontal conveyor mounted thereon;

FIG. 3 is a top plan view showing a detail of the horizontal conveyor in different position and the wheel of an automobile assumed to be parked in one of the compartments;

FIG. 4 is a horizontal section through two compartments showing in plan view a modified elevator platform therebetween;

FIG. 5 is an enlarged detail view of the horizontal conveyor shown in FIG. 4;

FIG. 6 illustrates a part of the structure shown in FIG. 4 with the horizontal conveyor in a different position;

FIG. 7 is a vertical section through a further embodiment of the elevator platform;

FIGS. 8 to 11 show four different modifications of the followers forming part of the horizontal conveyor for moving a vehicle onto or off the elevator platform;

FIGS. 12 and 13 show two additional modifications of the horizontal conveyor;

FIG. 14 is perspective view of a twin elevator platform with certain parts partly broken away;

FIG. 15 is an enlarged vertical section taken on line XV—XV of FIG. 14;

FIG. 16 is a section taken on line XVI—XVI of FIG. 15, showing the horizontal conveyor in a different position;

Figure 17:
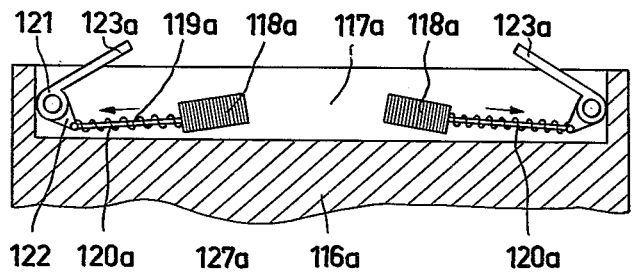
FIG. 17 is an enlarged detail view showing a pair of modified followers pivotable into operative position by electromagnets.

Referring now in greater detail to the drawings, and first to the embodiment illustrated in FIGS. 1 to 3, there is shown an automobile parking garage 20 consisting of vertically extending adjacent sections 21, 21', 21", each of which is serviced by its own elevator. Section 21 is fully shown in FIG. 1. It comprises an elevator shaft 22 and superimposed parking compartments 23, 23', 23". Elevator platform 24, drawn to a larger scale in FIG. 2, is suspended on cables 25 for vertical movement in the shaft 22. Cables 25, whose free ends are anchored in brackets 26, are led over guide rollers 28 mounted on shafts 27 and are operated by winches 29. Shaft 30 on which the winches are installed is rotatable in two directions by a reversible electric motor 31. The assembly of members 27-31 is suspended from the ceiling 35 by means of downwardly extending brackets 32, 33 and 34. Idler rollers 36 are mounted in bearing members 37 adjacent to each longitudinal end face of the elevator platform 24, and are received in vertical guide rails 38 so as to control vertical movements of the elevator.

Section 21 is separated from adjacent sections 21', 21" by vertical partitions 39, the garage 20 further comprising a solid end wall 40 and a glass wall 41. At the ground floor level and adjacent to shaft 22, the glass wall 41 defines an entrance and exit opening 42 which, in the embodiment of FIG. 1, may be closed by a pivotable ramp 44. Ramp 44 is shown in a position enabling a patron to drive the automobile 43 onto the elevator platform 24 in shaft 22. The vehicle may be driven directly into the lowermost compartment 23 without using the horizontal conveyor which is installed on the elevator platform 24.

The end faces of compartment floors 45, 45', 45" are of such shape as to permit vertical movements of elevator platform 24 therealong. Platform 24 and each of the floors 45, 45', 45" is provided with parallel recesses or channels 46, 47 so disposed that the channels in the upper face of platform 24 are aligned with and form continuations of similar channels in one of the compartment floors, depending upon the momentary position of the elevator. Channel 46 receives a dolly 48 of U-shaped cross sectional contour which is mounted on wheels 50 permitting longitudinal but no transverse movements in the channel 46. The other channel 47 is preferably somewhat wider so as to accommodate a pair of aligned wheels 49 of an automobile 43 irrespective of the type and wheel base of the vehicle. The other pair of wheels 49 rests on the dolly 48.

At its side facing a parking compartment, the elevator platform has a projecting horizontal ledge 51 fitting into one of cutouts 52, 52', 52" in the compartment floors 45, 45', 45", respectively. An endless chain 53 is installed for travel over an idler sprocket 55 mounted on a vertical shaft 57 in ledge 51 of the elevator platform, and a driven sprocket 54 whose vertical shaft 56 is rotatable by a reversible electric motor 58. Chain 53 carries a pair of horizontal, spaced followers or lugs 59a, 59b which, as will be described in more detail hereinafter, are so mounted as to alternately form rigid abutments extending at right angles from the stringer of chain 53 when the latter is moved in one direction, but will alternately yield to an obstruction in their path when the chain moves in the opposing direction. In FIG. 2, follower 59a is rigid when the sprocket 54 is rotated in anti-clockwise direction and is pivotable through about 90 degrees when the sprocket 54 rotates clockwise. Follower 59b, on the other hand, will yield to an obstruction when sprocket 54 moves anti-clockwise.

Dolly 48 carries a horizontal, rigidly mounted projection or lug 60 which extends into the path of followers 59a, 59b when the chain 53 is driven. It will be seen that the assembly of members 53-58, 59a and 59b constitutes a horizontal conveyor which, in cooperation with dolly 48, will move a vehicle parked in one of compartments 23, 23', 23" back onto the elevator platform 24 or vice versa. Depending upon the direction of movement of chain 53, one of the followers 59a, 59b engages the lug 60 and causes movements of the dolly in channel 46 in the elevator platform 24 and in one of aligned channels in compartment floors 45, 45', 45".

In FIG. 2, in which no automobile has been shown for the sake of clarity, and assuming that the chain 53 is driven in anti-clockwise direction, the left-hand follower 59a is about to engage the lug 60. Thus, an automobile whose wheels rest on dolly 48 and in the channel 47 of platform 24, is moved off said platform and onto the floor 45' of the adjacent parking compartment 23', it being further assumed that the elevator with the automobile is at the second floor level. During such movement of the dolly, the right-hand follower 59b travels about sprocket 55 and toward sprocket 54 until the vehicle reaches its parked position. For removal of a parked automobile, the motor 58 is reversed to drive chain 53 in clockwise direction. The left-hand follower 59a moves away from the lug 60 which latter, upon continued travel of chain 53 in the direction of arrow 61 (see FIG. 3), is engaged by the follower 59b to return dolly 48 and thus the parked automobile back onto the elevator platform 24.

When the dolly 48 is in the position illustrated in FIG. 3, that is, on the floor 45 of lowermost compartment 23, and one desires to move the elevator platform to a higher floor, for example, to the level of floor 45', followers 59a, 59b must be moved into a position in which they do not interfere with the travel of the elevator. It will be noted that, in the position of FIG. 3, follower 59b would strike against the floor 45' if the elevator platform 24 where lifted without first displacing the followers. For that purpose, elevator platform 24 is slightly raised or lowered above or below the level of floor 45 and the followers 59a, 59b are then free to bypass the lug 60 and can be moved by chain 53 into their position shown in FIG. 2. Platform 24 is now free to bypass the compartment floors.

As an alternative, followers 59a, 59b may be moved into a position facing away from the dolly 48, i.e. in a position mirror reverse to that shown in FIG. 2.

As an additional alternative, followers 59a, 59b may be mounted in such a way as to be selectively pivotable in both directions. For that purpose, a system of electromagnets, as will be described in greater detail in connection with FIG. 8, can be utilized. Obviously, such followers need not be displaced but merely pivoted in one or the other direction before the elevator is set in motion.

It will be seen that, by the provision of ledge 51 and by mounting of the sprocket 55 on said ledge so as to extend the range of the horizontal conveyor in the longitudinal direction and past the transverse edge of platform 24, a relatively simple apparatus is capable of parking or unparking automobiles on and off superposed compartment floors 45, 45', 45". Dolly 48 may be omitted altogether, and in such case the chain followers engage directly with the wheels of an automobile, for example, in the manner illustrated in FIG. 9 to be explained in greater detail as this description proceeds.

Another embodiment of the invention is shown in FIG. 4. Each section 21a of the garage 20a comprises another row of vertically aligned compartments 23a adjacent to the other transverse end of elevator platform 24a in shaft 22a. Platform 24a has a second ledge 51a fitting into recess 52a' in the floor 45a' of compartment 23a'. Driven sprocket 54 is mounted on ledge 51a whereby the horizontal conveyor is capable of moving a vehicle from the elevator platform into either of compartments 23', 23a' or vice versa. Each of dollies 48, 48a, in addition to lug 60, carries a similar lug 60a adjacent to its other end, lug 60 of dolly 48 being engaged by the follower 59 or 59a when the dolly 48 is to be moved into or from compartment 23', and the other lug 60a of dolly 48a being engaged when the dolly 48a is moved into or from the second compartment 23a'. Other parts of the horizontal conveyor are identical with those described in connection with FIGS. 1 to 3 and, obviously, garage 20a too, may extend either above or beneath the ground level to comprise two, three or more stories. If the novel structure is installed in an underground garage or in a garage extending partly above and partly beneath the ground level, the vehicles may be driven onto the elevator platform through either of compartments 23, 23a which are closest to the street level.

It is assumed in FIG. 4 that the building 20a is a multi-story structure extending above the streel level and that compartments 23', 23a' are on the second floor of the structure. It is further assumed that an automobile is already parked in compartment 23a' (only wheels 49a shown) and that a second automobile is on the elevator platform 24a. This second automobile, whose wheels 49 are shown in position on the dolly 48 in channel 46 and in channel 47 of the platform 24a, is to be moved in the direction of arrow 62 into compartment 23'. The procedure is identical with that described in connection with FIGS. 1 to 3, FIG. 6 showing an intermediate position of the chain 53, of followers 59, 59a and of dolly 48 before the vehicle is fully parked in said compartment. Thus, front lug 60a of the dolly 48 is inactive, while the rear lug 60 is engaged by the follower 59 which latter is so mounted as not to yield to an obstruction when traveling in the direction of arrow 62 to move dolly 48 in aligned channels 46 toward right until the dolly 48 and the vehicle are on the floor 45' of compartment 23'. Sprocket 55 is mounted on ledge 51 at a point sufficiently close to the transverse wall of cutout 52' whereby the rear end of an automobile parked in compartment 23' does not overhang the elevator platform 24a. In other words, ledges 51, 51a of the elevator platform extend sufficiently into cutouts 52', 52a' in the parking compartments to permit deposition of all types of automobiles irrespective of the length of the trunk portion extending beyond the rear wheels.

If it is desired to move an automobile parked in compartment 23a' back onto an empty elevator platform 24a, and assuming that the followers 59, 59a are in their position shown in FIG. 4, chain 53 is first driven by motor 58 in clockwise direction until the follower 59 strikes against lug 60a of the dolly 48a located in compartment 23a' and, being yieldable when meeting an obstruction during movement in that direction, pivots anti-clockwise to bypass the lug and thereafter immediately reassumes its normal position adjacent to the left-hand side of lug 60a. Motor 58 is then reversed to move chain 53 and followers 59, 59a in anti-clockwise direction. Follower 59, which does not yield to an obstruction when so moved, strikes against and entrains the lug 60a together with dolly 48a and the automobile, two wheels 49a whereof are in position on the dolly 48a. The anti-clockwise movement of chain 53 is stopped when the automobile is centered on elevator platform 24a, i.e. when its wheels 49a assume the position of wheels 49 shown in FIG. 4.

The manner of attaching follower 59a to a chain link 68 is shown in FIG. 5. It is assumed here that a dolly 48 is in compartment 23' and that the chain 53 moves in the direction of arrow 63. Follower 59a, which is pivotally connected to the link 68 for movements with respect thereto in a substantially horizontal plane, upon reaching the left-hand lug 60 of dolly 48, yields against the pressure of constantly acting spring 64 to bypass the obstruction and thereupon immediately reassumes its original position in which its end face 66 abuts against the shoulder 67 in the chain link 68. If the movement of chain 53 is reversed, follower 59a, its end face 66 now abutting against shoulder 67, is unable to yield upon striking against the lug 60 and entrains the dolly 48 with or without an automobile in the direction of arrow 65.

In FIG. 7, there is shown in vertical transverse section a modified elevator platform 24b whose horizontal conveyor comprises a chain 53b moving in a vertical plane over a pair of spaced sprockets. Horizontal shaft 57b of idler sprocket 55b is mounted in a pair of bearing members 69. The followers (only the follower 59c being shown) extend horizontally at right angles from the plane in which the chain 53b moves. In this embodiment of my invention, the followers engage a lug 72 extending downwardly from the underside of a platform truck 70 whose wheels 71 travel in ways 46b, 47b in the upper face of elevator platform 24b. It will be seen that the width of platform car 70 equals the width of elevator platform 24b; therefore, the car 70 accommodates all four wheels of an automobile. Here, too, the followers are yieldable in opposing (see FIGS. 1 to 6) or both directions (see FIG. 8), and the platform 24b has at least one ledge which extends into the adjacent floor of a parking compartment.

FIG. 8 illustrates a follower 73 which is yieldable in either direction, depending upon the position of electromagnets 76a, 76b. These magnets are retractable into suitable recesses provided in the chain link 75. The end face of follower 73 adjacent to the chain link 75 is rounded whereby the follower, which is rotatably mounted on a pin 74, is free to yield to an obstruction and to pivot through up to 90 degrees from its position shown in full lines, depending upon the direction of movement of the chain. As shown, electromagnet 76a blocks the pivoting movement of follower 73 in anti-clockwise direction; however, when acted upon by a force in the direction of arrow 77, the follower will yield and assume its broken-line position 73'.

As shown in FIG. 9, an elevator platform provided with the horizontal conveyor of my invention is capable of parking or unparking an automobile without the aid of a dolly (48, 48a) or a platform truck (70) by direct action of the followers against the automobile wheels. Follower 78, traveling with chain 53c in the direction of arrow 62c, engages the periphery of wheel 79 preferably at the level of the wheel axis. It is advisable to provide the follower 78 with a freely rotatable roller 80 which may be made of a resilient rubber-like material to act as a cushion and which engages the peripheral zone of the automobile wheel 79.

FIG. 10 is a perspective view of another form of the horizontal conveyor mounted for travel adjacent to one longitudinal edge of the elevator platform 24c. The lower wall of the longitudinal recess 83 is formed into a toothed bar 81 whose teeth mesh with the teeth of a wheel (not shown) mounted in the carriage 82 received in the recess 83. The wheel is rotated by a reversible motor 84 which, depending upon the direction of its rotation, causes the carriage 82 to move to the right or to left replacing the assembly of members 53–58 shown in FIG. 2. Followers 85a, 85b pivotally mounted in carriage 82, are operatable by a pair of hydraulic cylinders. Cylinder 86 actuates the follower 85b and, according to FIG. 10, holds this follower in position for abutment against the lug of a dolly, of a platform truck, or directly against an automobile wheel. The recess 83 extends into one or both ledges of the platform 24c depending upon whether the elevator services a single row (see FIGS. 1 to 3) or two rows (see FIG. 4) of parking compartments.

FIG. 11 shows diagrammatically a slight modification of the system illustrated in FIG. 10. The lug 87, instead of being mounted for pivotal movement about a vertical axis (see lug 85b in FIG. 10), is attached to a carriage (not shown) in recess 82d in such manner that it may be pivoted from its position shown in full lines into its broken-line position 87'. Thus, the follower 87 is pivotable in a plane perpendicular to the general plane of platform 24d and at right angles to the direction of its travel in recess 82d.

The conveyor 88, according to FIG 12, may comprise a dolly 89 and an electric or hydraulic jack 90 which lifts the front end or the rear end of an automobile. As is shown in FIG. 13, dolly 89 may support an electromagnet 91 which, because acting in both directions and upon contacting a magnetizable part of the automobile chassis, or upon contact with a carrier corresponding, for example, to dolly 48 shown in FIGS. 1 to 3, will entrain the vehicle in either direction. As shown, the wheels of dolly 89 travel along the side walls of a ridge which extends centrally the full length and onto ledge 51e of the elevator platform 24e.

FIG. 14 illustrates a twin elevator comprising two spaced platforms 92, 93 with an endless chain 53f movable in a vertical plane therebetween. An automobile 43f is shown in position on the dolly 94 upon platform 92. A second, empty dolly 94a is located on the symmetrically disposed platform 93.

Platforms 92, 93 are reinforced by a supporting framework 95, their adjacent longitudinal edges being fixed to respective beams 96, 97 which extend beyond the transverse edges of the platform and thus form two ledges corresponding, for example, to parts 51, 51a of platform 24a shown in FIG. 4. The webs of beams 96, 97 are in parallel vertical planes so as to accommodate therebetween certain elements of the horizontal conveyor including the endless chain 53f.

Floors 99 and 100 of two parking compartments, shown in broken lines at the right-hand longitudinal end of the twin elevator platform, define therebetween a recess 98 for the passage of projecting ends of beams 96, 97. Two similar compartment floors 99a, 100a are represented in broken lines at the left-hand longitudinal end of the elevator.

Chain 53f travels over sprockets 101, 101a which are rotatably mounted on the web of beam 96. As is shown in FIG. 15, sprocket 101a is rotatably fixed to a bearing member 102 and the latter is secured to the web of beam 96 by means of bolts and nuts 103. Driven sprocket 101 is mounted in similar fashion.

Chain 53f has affixed thereto a horizontal pin 104 pointing toward beam 97, and a rocker cam 105, rotatably mounted on pin 104, is received in a vertical slot 106 in the web of a carriage 107. Slot 106 is best shown in FIG. 16. The web of carriage 107 is located between and is parallel with the webs of beams 96, 97; the carriage further comprising an upper horizontal flange with downwardly bent ends 108, and a lower horizontal flange with downwardly bent ends 109. Each member 108, 109 supports a short shaft 110 for flanged rollers 111 running along the upper and lower faces of beams 96, 97. In this manner, carriage 107 can move practically the full length of members 96, 97 and thus extends into either one of the four parking compartments whose floors 99, 99a and 100, 100a are shown in FIG. 14 in broken lines. When the sprocket 101 is driven anti-clockwise, rocker cam 105 travels along the upper stringer of chain 53f (see FIG. 15) and entrains the carriage 107 toward left (see FIG. 14). While traveling about sprocket 101, rocker cam 105 moves downwardly in the vertical slot 106 over its intermediate position shown in FIG. 16 and thereupon returns toward sprocket 101a along the lower stringer of chain 53f.

Sprocket 101 is driven by a coaxial pulley 112, belt 113 and pulley 114 which latter is rotatable by an electric motor 115 mounted in the supporting frame 95. A plate 116, welded or otherwise secured to the upper side of carriage 107, carries four followers 123 which, in cooperation with lugs 124 rigidly fixed to dollies 94, 94a, selectively move the latter into or out of a parking compartment. Two followers 123 are shown in FIG. 15 in extended position. Each follower is connected to a rod 120 and is normally held in retracted position in recess 117 under the influence of a coil spring 119. The other end of each rod 120 extends into an electromagnet 118 which, when energized, expels the rod 120 with follower 123 into operative position.

FIG. 17 illustrates a modification of the follower system shown in FIG. 15. It is a section taken in a plane parallel with the upper face and inwardly from a longitudinal edge of plate 116a analogous to plate 116. Each follower 123a constitutes one arm of an angle lever 121 mounted for pivotal movement in a horizontal recess 117a in the plate 116a. The other arm 122 of each lever is pivotally connected with a rod 120a whose other end extends into electromagnet 118a. Coil springs 119a tend to move rods 120a in the direction of arrows and thus cause followers 123a to pivot into the recess 117a. When energized, electromagnets 118a retract the rods 120a and thus move followers 123a into operative position. A similar arrangement of two angle levers 121 is provided in the other longitudinal side face of the plate 116a.

In the embodiment of FIG. 14, followers 123 or 123a, in cooperation with lugs 124, move dollies 94, 94a into any of the four parking compartments since the carriage 107 with plate 116 can travel over the recess 98 or 98a. This is made possible by the extensions of beams 96, 97 which, as above stated, extend into said recesses and permit travel of dolly 107 beyond both transverse edges of platforms 92, 93. A chain operating in a horizontal plane could replace member 53f with the chain followers engaging lugs 124 or acting directly against the wheels of an automobile.

Figure 18:
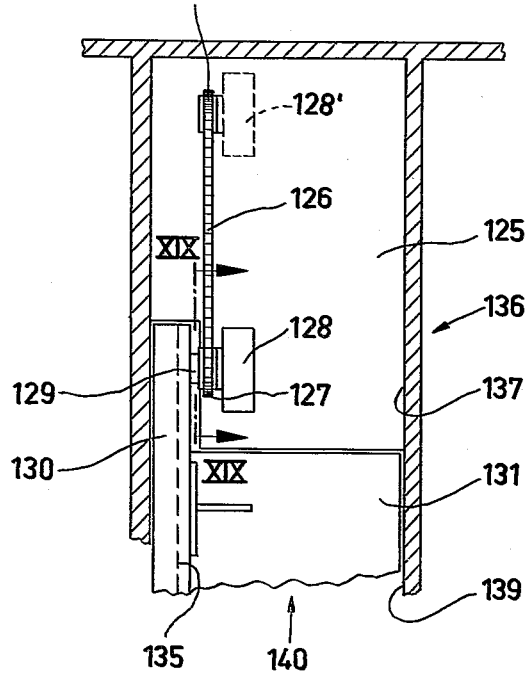
FIG. 18 is a horizontal section through a modified parking compartment showing an additional horizontal conveyor mounted on the compartment floor.
Figure 19:
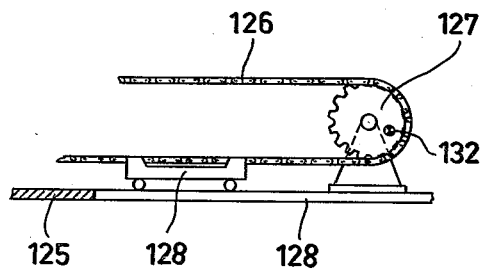
FIG. 19 is an enlarged detail view in partial section taken on line XX—XX of FIG. 18.

In a further modification of my invention illustrated in FIG. 18, there is shown a garage 136 in horizontal section revealing a parking compartment 137 having a floor 125 provided with a recess 138 for reception of the ledge 130 of an elevator platform 131 mounted for vertical movement in the shaft 139. An endless chain 126 travels in a vertical plane over sprockets 127, 127a which are supported in suitable bearings on compartment floor 125. A dolly 128, better shown in FIG. 19, is connected with chain 126 and travels on floor 125 between its position shown in FIG. 18 in solid lines and its broken-line position 128'. It is so shaped as to receive the left front wheel of an automobile which latter may be moved off the elevator platform 131 by a follower 133 attached to carriage 134 mounted for travel in a longitudinal recess 135 in the elevator platform. Recess 135 extends into the ledge 130. Carriage 134 may operate in a manner similar to that described in connection with FIG. 10. Chain 126 is driven by a coupling 129 attached to the ledge 130 of the elevator platform which may be connected with or disconnected from the sprocket 127 by a pin 132 (see FIG. 19). Coupling 129 is operatively connected with an electric motor (not shown) attached to the elevator platform 131.

If an automobile is to be parked on the floor 125 of compartment 137, it is moved by follower 133 in the direction of arrow 140 whereby its left front wheel comes to rest on the dolly 128 and entrains the latter into position 128'. In such position of the dolly 128, the automobile is properly parked in compartment 137.

When the operation is reversed, i.e. the parked vehicle is to be returned onto the elevator platform 131, connection is established between the sprocket 127 and coupling 129 by means of connecting pin 132, and the chain 126 is driven in anti-clockwise direction, reference being had to FIG. 19. Upon return of dolly 128 into its position shown in solid lines in FIG. 18, follower 133 engages the left rear wheel of the automobile and returns it onto the elevator platform. Upon disconnection of pin 132, the elevator may be moved to a higher or lower level, as the need may be. Thus, the chain 126 is operated only for unparking of automobiles while the parking operation is performed solely by the follower 133.

Figure 21:
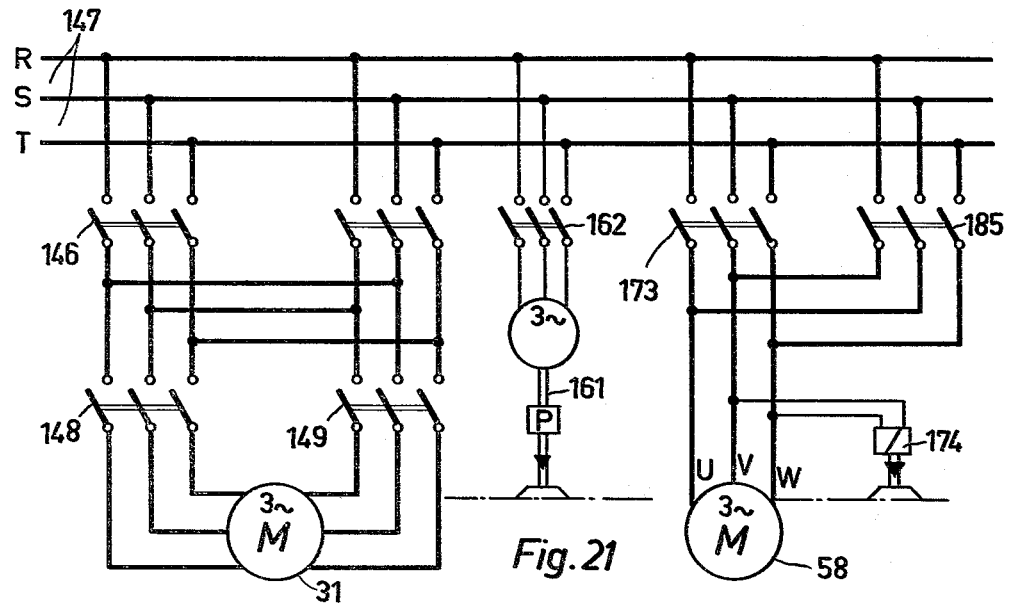
FIGS. 20 and 21 are schematic representations of the control system for automatic operation of the elevator and horizontal conveyor of FIGS. 1 to 3.
Figure 20:
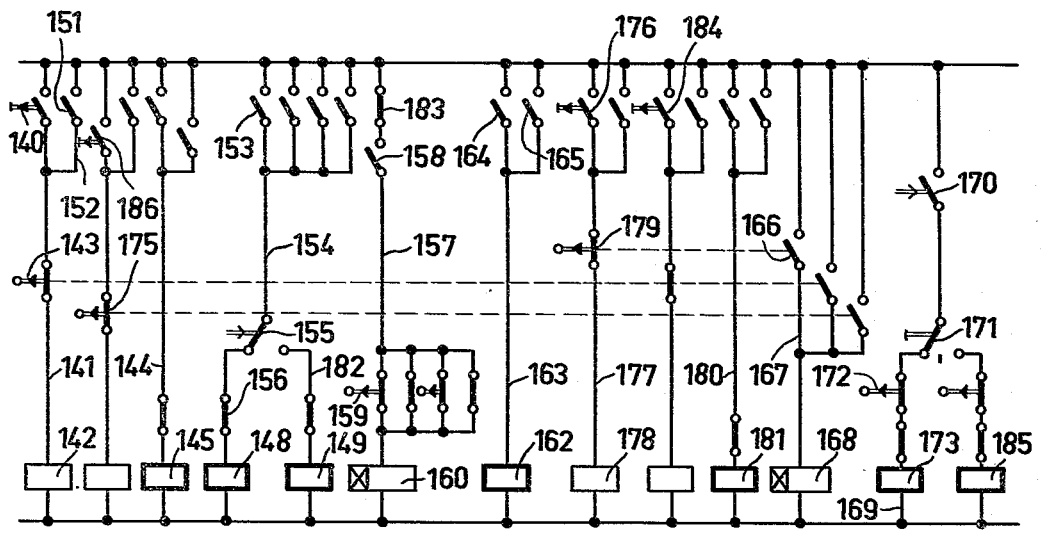

FIGS. 20 and 21 illustrate, by way of example, an electric control system for automatic operation of the parking apparatus shown in FIGS. 1 to 3.

It is assumed that an automobile 43 is located on the platform 24 at the ground floor level and should be stored in compartment 23″. A knob 140 in line 141 is depressed to energize a floor selector relay 142 over the closed terminal switch 143. Relay 142 closes the circuit 144 of a relay 145 thus causing the closing of contacts 146 (see FIG. 21) which, upon closing of relays 148, 149, connect the elevator motor 31 with lines 147 in such a way as to cause upward movement of elevator platform 24 with the automobile 43 thereon. Relay 142 is maintained energized upon release of knob 140 by a contact 151 in the bypass line 152. The energizing of relay 148 for, say, upward movement of platform 24 is caused by a switch 153 in line 154 which, over a make-and-break contact 155 and an interlocking contact 156, energizes said relay 148 causing the reversible motor 31 to operate at a low speed and to move the elevator platform in upward direction. A switch 158 in line 157 closes and energizes, over a limit switch 159, the time delay relay 160 which, after a preset time interval, causes the make-and-break contact 155 to open the circuit of relay 148 and connects relay 149 in line 154, the energized relay 149 causing motor 31 to operate at a higher speed. The elevator platform is now rapidly lifted toward the floor 45″ of compartment 23″ which latter was selected by the knob 140 over the floor selector relay 142. Shortly before the platform 24 reaches the level of floor 45″, limit switch 159 is tripped and de-energizes the time delay 160 and hence relay 149, causing the motor 31 to reduce the velocity of upward movement of the elevator. Switch 143 is tripped by the upwardly moving platform 24 and de-energizes relay 142 to arrest the motor 31. During such upward movement of the elevator, the electrohydraulic brake schematically shown at 161 (see FIG. 21) is inactivated by a relay 162 in line 163 which latter is energized upon tripping one of switches 164, 165.

A switch 166 in line 167 of the control element 143 energizes time delay relay 168 which latter, after a preset time interval, closes a contact 170 and a selector switch 171 in the line 169 over a closed terminal switch 172 to energize relay 173. This relay connects the motor 58 of chain 53 with lines 147 in such a way as to move the chain in counterclockwise direction whereby the follower 59a (see FIG. 2) moves the dolly 48 with automobile 43 into compartment 23″. Brake 174 of the horizontal conveyor is automatically released by a magnet (not shown) while the chain 53 is in motion. Switch 172 opens when the automobile is properly located either by abutting against a suitable stop (not shown) in the compartment 23″ or by a printing circuit, and arrests the motor 58. The automobile 43 is now fully parked in compartment 23″.

If the vehicle should be lifted to the level of compartment 23′, this can be achieved by depressing a knob 186 in the circuit of control switch 175. The number of such knobs corresponds to the number of compartments in the garage above and/or beneath the ground floor level, and these may be installed in the control system in a manner similar to that of knob 140 or 186, each with its own selector relay (142 for knob 140) and bypass line (152 with switch 151).

For descent of platform 24, knob 176 in line 177 is depressed to energize a relay 178 over the closed terminal switch 179. Relay 181 in line 180 is also energized to reverse two phases of the electric current in lines 147 (see FIG. 21) so that the motor 31 now rotates in the opposing direction. A contact of relay 178 opens the circuit of line 182 and energizes relay 148 causing the elevator motor to operate at low speed. An open contact 183 of the directional relay 181 prevents energization of time delay relay 160 in line 157 and causes the motor 31 to operate at low speed. In this manner, the motor is driven hypersynchronously by the weight of platform 24 and actually operates as a brake. Upon tripping of the terminal switch 179 at the ground floor level, relay 178 is de-energized causing the platform to stop by disconnecting the motor 31 and by actuating the brake 161.

The descent of platform 24 to the level of compartment 23′ can be controlled by the knob 184. Additional operating knobs similar to elements 176, 184 may be provided, if necessary, their total number being equal to the number of storeys in the garage above and/or below the ground floor level. The system of FIGS. 20 and 21 with knobs 140, 186 for upward movement and knobs 176, 184 for descent of platform 24 is intended for a three-storey garage, as shown in FIG. 1.

To unpark an automobile from the compartment 23″ switch 171 is moved into it second operative position. With switch 170 also closed, relay 185 becomes energized and causes rotation of motor 58 in the opposing direction (clockwise according to FIG. 2).

When the empty platform 24 is located beneath the floor of one of parking compartments from which an automobile is to be removed, knob 140 (compartment 23″) or knob 186 (compartment 23′) is depressed to cause movement of the elevator to the level of a selected compartment floor, as above described, and the vehicle is then moved onto platform 24 after the position of switch 171 is reversed. When the vehicle is safely located on the platform 24, the elevator is caused to descend by operating the contact 176 or 184 as above described.

If the platform 24 is above the level of a selected compartment from which a vehicle should be removed, the elevator is first set in motion by actuating contact 176 or 184 to bring its platform to a desired level. Motors 58 and 31 in that order, the former in clockwise and the latter in downward direction, are then operated as above described.

If the elevator platform is at the level of a selected compartment, the unparking of an automobile by means of motor 58 may be carried out directly upon reversing the position of switch 171. It is advisable to provide for an open median position of switch 171 (see FIG. 20) so as to allow the elevator platform to move in vertical direction without automatically actuating the control mechanism of motor 58.

The control systems for other embodiments of my invention hereinabove described will require certain modifications which will be obvious to men skilled in the art and thus require no detailed description.

What I claim and desire to protect by Letters Patent is:

1. A parking and warehousing system comprising a storage structure having a plurality of side walls and horizontal floors defining at least one vertical hollow shaft and a plurality of vertically aligned storage compartments, each of said compartments being adjacent said shaft and opening into said shaft, said horizontal floors being of unitary construction extending within said compartments from wall-to-wall and defining the limits of said shaft, an elevator platform within said shaft, the portion of the periphery of each of said floors of said compartments which defines the limits of said shaft having a recess therein extending from said shaft into its compartment along one side thereof, said elevator platform having an arm extending from the main body of the platform to fit within said recesses so that said arm is situated alongside of at least a portion of the compartments of the floor with which the platform is aligned, means for moving said platform vertically in said shaft, said recesses being vertically aligned to permit free vertical movement of the arm therethrough as the platform is moved vertically, horizontally operative conveyor means located on said platform and extending onto said arm so that an end portion thereof is situated within the periphery of said recess, reversible power means to drive said conveyor means in a horizontal manner, and follower means associated with said conveyor means and movable thereby in a horizontal direction for moving articles to be stored from said platform into said compartments and from said compartments onto said platform, said conveyor means being vertically movable with said platform.

2. A structure according to claim 1, comprising at least two vertical rows of storage compartments adjacent to the longitudinal ends of and opening toward said elevator platform, each of said recesses facing said elevator platform, said platform having a pair of arms at its longitudinal ends each extending into the adjacent one of said recesses in said floors, said horizontal conveyor means extending onto each of said arms of said platform, said power means selectively operating said conveyor means in either longitudinal direction of said platform.

3. The structure according to claim 1, wherein said horizontal conveyor means comprises a toothed bar, said follower means being mounted for movement along said toothed bar, and means is provided for so moving said follower means.

4. The structure according to claim 1, wherein said horizontal conveyor means comprises an endless flexible element, and means is provided for driving said flexible element in clockwise and anti-clockwise direction.

5. The structure according to claim 4, wherein said flexible element is an endless chain and further comprising a driven sprocket and a driving sprocket supported by said platform with said chain mounted for travel about said sprockets, said means for driving said chain being a reversible motor operatively coupled with said driving sprocket.

6. The structure according to claim 4, wherein said platform comprises a single arm at one longitudinal end thereof and said flexible element is mounted for travel in a horizontal plane, said horizontal conveyor means further comprising a driving and a driven sprocket with said flexible element mounted for travel thereabout, one of said sprockets being mounted on said arm.

7. The structure according to claim 4, wherein said platform comprises a pair of arms at the respective longitudinal ends thereof and said horizontal conveyor means further comprises a pair of sprockets each installed on one of said arms with said flexible element mounted for travel about said sprockets, at least one of said sprockets being operatively coupled with said means for moving said flexible element.

8. The structure according to claim 4, wherein said horizontal conveyor means further comprises a pair of spaced sprockets with said flexible element mounted for travel in a vertical plane thereabout, and said means for moving said flexible element is a reversible motor operatively coupled with one of said sprockets.

9. The structure according to claim 4, wherein said follower means are spaced lugs connected with and in the plane of movement of said flexible element.

10. The structure according to claim 4, wherein said follower means are spaced lugs connected with and disposed at an angle to the plane of travel of said flexible element.

11. The structure according to claim 4, wherein said platform and each of said compartment floors have aligned channels for guiding articles to be stored in or removed from said compartments, and said follower means extend into the adjacent one of said channels for engaging one of the articles.

12. The structure according to claim 4, wherein said follower means comprises spaced lugs articulately connected to said flexible element in such a way as to yield to an obstruction while said flexible element moves in one direction, and rigidly extending from said flexible element when the latter moves in the other direction.

13. The structure according to claim 4, wherein said follower means comprises a pair of spaced lugs fixed to said flexible element, one of said lugs being rigid with said flexible element when the latter moves in one direction and the other of said lugs being rigid with said flexible element when the latter moves in the other direction.

14. The structure according to claim 1, wherein said follower means are selectively retractable into and projectable from said horizontal conveyor means, and means is provided for so moving said follower means.

15. The structure according to claim 1, wherein said follower means comprises a pair of spaced lugs articulately connected to said horizontal conveyor means, and means is provided for selectively holding said lugs in fixed position with respect to said horizontal conveyor means.

16. The structure according to claim 1, wherein said horizontal conveyor means comprises a dolly and means for moving said dolly longitudinally of said elevator platform and onto said arms of the latter, and lifting means carried by said dolly.

17. The structure according to claim 16, wherein said lifting means is a hydraulic jack.

18. The structure according to claim 16, wherein said lifting means is an electric jack.

19. The structure according to claim 1, wherein said follower means comprises electromagnetic coupling means for engaging with a magnetizable element of the articles stored in one of said compartments or located on said platform.

20. The structure according to claim 1, wherein said follower means comprises at least one electromagnet, and further comprising a dolly and means for guiding said dolly longitudinally of said platform and onto each of said compartment floors, said dolly being of magnetizable material and in the path of said electromagnet when said horizontal conveyor means is set in motion.

21. The structure according to claim 1, wherein said elevator platform is a twin platform having a longitudinal recess in the median portion and a arm at each longitudinal end thereof with said last mentioned recess extending into said arms, said horizontal conveyor means being an endless flexible element mounted in said last mentioned recess in a vertical plane, and further comprising a pair of sprockets at the respective extremities of said last mentioned recess in said arms with said flexible element mounted for travel over said sprockets, reversible motor means operatively connected with one of said sprockets for moving said flexible element in clockwise and anti-clockwise direction, a wheel-mounted platform on said elevator platform having a member extending into said last mentioned recess, said member having a substantially vertical elongated closed slot, a roller fixed to said flexible element and extending into said closed slot, said follower means comprising two pairs of lugs articulately fixed to the longitudinal side edges of said last mentioned platform with one lug adjacent to each longitudinal end thereof, and means for moving said lugs in a horizontal plane with respect to said wheel-mounted platform into a first position transversely of said last mentioned recess and into a second position in which said lugs are retracted into said wheel-mounted platform.

22. A parking and warehousing system comprising, in combination, a plurality of side walls and horizontal floors defining therebetween at least one vertical shaft and at least one vertically aligned row of storage compartments adjacent to and opening into said shaft; an elevator platform and means for moving said platform in vertical direction in said shaft, said platform having at least one ledge forming an extension of said platform at one longitudinal end of the latter, each of said floors in said compartments having a recess at its side facing said shaft for the passage of said ledge therethrough when said elevator platform is moved in vertical direction; horizontal conveyor means mounted for operation in the longitudinal direction of said elevator platform, permanently carried by said platform, restricted in its movements within the confines of the platform, and extending onto said ledge thereof; follower means associated with said horizontal conveyor means and movable by the latter onto the ledge for thereby moving an article placed onto said elevator platform into one of said compartments and for engaging an article in one of said compartments and for returning the same onto the elevator platform when moved by the conveyor means from said ledge in a direction away from the respective compartment, and comprising at least four vertical rows of parking compartments, two at each longitudinal end of said elevator platform, said platform having a ledge at each longitudinal edge thereof, the floors of each of said compartment pairs at each level of said structure defining therebetween a median recess for reception therein and passage therethrough of one of said ledges, said horizontal conveyor means extending onto each of said ledges and longitudinally and centrally of said elevator platform, and drive means being provided for selectively operating said horizontal conveyor means in either longitudinal direction of said platform.

23. A parking and warehousing system comprising, in combination, a plurality of side walls and horizontal floors defining at least one vertical shaft and at least one vertically aligned row of storage compartments adjacent to and opening into said shaft; an elevator platform and means for moving said platform in vertical direction in said shaft, said platform having at least one ledge forming an extension of said platform at one longitudinal end of the latter, each of said floors in said compartments having a recess at its side facing said shaft for the passage of said ledge therethrough when said elevator platform is moved in vertical direction; horizontal conveyor means mounted for operation in the longitudinal direction of said elevator platform, permanently carried by said platform, restricted in its movements within the confines of the platform, and extending onto said ledge thereof; follower means associated with said horizontal conveyor means and movable by the latter onto the ledge for thereby moving an article placed onto said elevator platform into one of said compartments and for engaging an article in one of said compartments and for returning the same onto the elevator platform when moved by the conveyor means from said ledge in a direction away from the respective compartment; said horizontal conveyor means comprising an endless flexible element, means provided for driving said flexible element in clockwise and anti-clockwise direction; and further comprising a dolly for at least partially supporting the articles to be stored in or removed from one of said compartments, and guide means on said platform and on each of said compartment floors for so locating said dolly as to engage with said follower means when said flexible element is set in motion.

24. A parking and warehousing system comprising, in combination, a plurality of side walls and horizontal floors defining at least one vertical shaft and at least one vertically aligned row of storage compartments adjacent to and opening into said shaft; an elevator platform and means for moving said platform in vertical direction in said shaft, said platform having at least one ledge forming an extension of said platform at one longitudinal end of the latter, each of said floors in said compartments having a recess at its side facing said shaft for the passage of said ledge therethrough when said elevator platform is moved in vertical direction; horizontal conveyor means mounted for operation in the longitudinal direction of said elevator platform, permanetly carried by said platform, restricted in its movements within the confines of the platform, and extending onto said ledge thereof; follower means associated with said horizontal conveyor means and movable by the latter onto said ledge for thereby moving an article placed onto said elevator platform into one of said compartments and for engaging an article in one of said compartments and for returning the same onto the elevator platform when moved by the conveyor means from said ledge in a direction away from the respective compartment; wherein said horizontal conveyor means comprises an endless flexible element mounted on said elevator platform for movement in a vertical plane, a wheel-mounted platform having a slot, a lug fixed to said flexible element and extending into said slot for moving said last mentioned platform on said elevator platform, and said follower means being connected to said wheel-mounted platform.

25. The structure according to claim 24, wherein said elevator platform has a pair of ledges extending centrally from the longitudinal ends thereof, and means is provided on said elevator platform and said ledges thereof for guiding said wheel-mounted platform therealong.

26. The structure according to claim 25, wherein said elevator platform has a central recess in the longitudinal direction and extending into said ledges thereof, and said flexible element is received in said recess, said wheel-mounted platform comprising a member extending into said recess with said slot provided in said member.

27. The structure according to claim 24, wherein said follower means are articulately connected to said wheel-mounted platform and means is provided for selectively pivoting said follower means with respect to said wheel-mounted platform.

28. The structure according to claim 27, wherein said follower means comprise two pairs of spaced lugs in the proximity of respective longitudinal side edges of said wheel-mounted platform so connected as to be extendable transversely from and retractable into said last mentioned platform, and further comprising a dolly adjacent to each longitudinal side edge of said wheel- mounted platform, each of said dollies having spaced lugs extending into the path of the adjacent ones of said follower means when the latter extend from said wheel-mounted platform and said flexible element is set in motion.

References Cited in the file of this patent

UNITED STATES PATENTS

| | | |
|---|---|---|
| 1,782,671 | Allred | Nov. 25, 1930 |
| 1,828,307 | Been | Oct. 20, 1931 |
| 1,977,785 | Wheelock | Oct. 23, 1934 |
| 2,510,573 | Gray | June 6, 1950 |
| 2,593,470 | Matthews et al. | Apr. 22, 1952 |
| 2,685,260 | Auger | Aug. 3, 1954 |